US012802407B2

(12) United States Patent
Gheorghita et al.

(10) Patent No.: US 12,802,407 B2
(45) Date of Patent: Nov. 17, 2026

(54) SYNTHETIC DATA GENERATION FOR MACHINE LEARNING FOR A CARDIAC MAGNETIC RESONANCE IMAGING TASK

(71) Applicant: Siemens Healthineers AG, Forchheim (DE)

(72) Inventors: Andrei Bogdan Gheorghita, Brasov (RO); Athira Jane Jacob, Plainsboro, NJ (US); Lucian Mihai Itu, Brasov (RO); Puneet Sharma, Princeton Junction, NJ (US)

(73) Assignee: Siemens Healthineers AG, Forchheim (DE)

( * ) Notice: Subject to any disclaimer, the term of this patent is extended or adjusted under 35 U.S.C. 154(b) by 573 days.

(21) Appl. No.: 18/056,286

(22) Filed: Nov. 17, 2022

(65) Prior Publication Data

US 2024/0169699 A1 May 23, 2024

(51) Int. Cl.
*G06V 10/774* (2022.01)
*G06T 7/00* (2017.01)

(52) U.S. Cl.
CPC .......... *G06V 10/774* (2022.01); *G06T 7/0012* (2013.01); *G06T 2207/10088* (2013.01);
(Continued)

(58) Field of Classification Search
CPC .......... G06N 3/02; G06N 20/00; G06N 3/045; G06N 3/088; G06N 3/0895; G06N 3/09;
(Continued)

(56) References Cited

U.S. PATENT DOCUMENTS

2016/0148371 A1 5/2016 Itu et al.
2016/0151047 A1 6/2016 Garbini et al.
(Continued)

FOREIGN PATENT DOCUMENTS

CN 114820469 A * 7/2022 ............. G06N 3/045

OTHER PUBLICATIONS

Abbasi-Sureshjani, S., Amirrajab, S., Lorenz, C., Weese, J., Pluim, J., & Breeuwer, M., 4D semantic cardiac magnetic resonance image synthesis on XCAT anatomical model, Sep. 2020, Medical Imaging with Deep Learning, Proceedings of Machine Learning Research (pp. 6-18). (Year: 2020).*
(Continued)

*Primary Examiner* — Andrew W Bee
*Assistant Examiner* — Emma E Dryden

(57) ABSTRACT

Cardiac magnetic resonance (CMR) imaging is synthesized, and/or machine learning for a CMR imaging task uses synthetic sample generation. A machine-learned model generates synthetic samples. For example, the machine-learned model generates the synthetic samples in response to input of values for two or more parameters from the group of electrocardiogram (ECG), an indication of image style, a number of slices, a pathology, a measure of heart function, sample image, and/or an indication of slice position relative to anatomy. The indication of image style may be in the form of a latent representation, which may be used as the only input or one of multiple inputs. These inputs provide for better control over generation of synthetic samples, providing for greater variance and breadth of samples then used to machine train for a CMR task.

16 Claims, 4 Drawing Sheets

(52) U.S. Cl.
CPC ............... *G06T 2207/20081* (2013.01); *G06T 2207/20084* (2013.01); *G06T 2207/30048* (2013.01); *G06V 2201/03* (2022.01)

(58) Field of Classification Search
CPC .......... G06N 3/091; G06N 3/092; G06N 3/08; G06N 3/0455; G06N 3/0475; G06N 3/044; G06N 3/0442; G06V 10/82; G06V 10/70; G06V 10/771; G06V 10/7715; G06V 10/772; G06V 10/774; G06V 10/764; G06V 20/70; G06V 10/25; G06V 2201/03; G06V 2201/031; G06T 2207/20081; G06T 2207/20084; G06T 11/00; G06T 11/001; G06T 11/60; G06T 11/40; G06T 3/60; G06T 3/40; G06T 11/008; G06T 2207/30048; G06T 7/0012–0016; G06T 2207/30101; G06T 2207/10088; G06T 2210/41; G06T 2207/30004; G01R 33/5608; A61B 2576/023; A61B 5/0044; A61B 5/0033
See application file for complete search history.

(56) References Cited

U.S. PATENT DOCUMENTS

| | | | | |
|---|---|---|---|---|
| 2017/0357844 | A1 | 12/2017 | Comaniciu et al. | |
| 2019/0392304 | A1* | 12/2019 | Aliper | G06N 3/08 |
| 2021/0312242 | A1* | 10/2021 | Jafarkhani | G06F 18/2148 |
| 2022/0121931 | A1* | 4/2022 | Kalarot | G06T 3/18 |
| 2022/0309342 | A1 | 9/2022 | Borgohain et al. | |
| 2023/0326158 | A1* | 10/2023 | Shayani | G06N 3/0455 345/419 |

OTHER PUBLICATIONS

Amirrajab, S., Al Khalil, Y., Lorenz, C., Weese, J., Pluim, J., & Breeuwer, M., Label-informed cardiac magnetic resonance image synthesis through conditional generative adversarial networks, 2022, Computerized Medical Imaging and Graphics, 101, Oct. 21, 2023. (Year: 2022).*

Diller, G. P., Vahle, J., Radke, R., Vidal, M. L. B., Fischer, A. J. et al., Utility of deep learning networks for the generation of artificial cardiac magnetic resonance images in congenital heart disease, 2020, BMC medical imaging, 20, 1-8. (Year: 2020).*

Lyu, Q., Shan, H., Xie, Y., Kwan, A. C., Otaki, Y., Kuronuma, K. et al., Cine cardiac MRI motion artifact reduction using a recurrent neural network, 2021, IEEE transactions on medical imaging, 40(8), 2170-2181. (Year: 2021).*

Peña, H., Gómez, S., Romo-Bucheli, D., & Martinez, F., Cardiac disease representation conditioned by spatio-temporal priors in cine-MRI sequences using generative embedding vectors, Nov. 2021, 2021 43rd Annual International Conference of the IEEE Engineering in Medicine & Biology Society, pp. 5570-5573 (Year: 2021).*

Beetz, M., Banerjee, A., & Grau, V., Multi-domain variational autoencoders for combined modeling of MRI-based biventricular anatomy and ECG-based cardiac electrophysiology, 2022, Frontiers in physiology, 13, 886723. (Year: 2022).*

Zhao, H., Li, H., Maurer-Stroh, S., Guo, Y., Deng, Q., & Cheng, L., Supervised segmentation of un-annotated retinal fundus images by synthesis, 2018, IEEE transactions on medical imaging, 38, No. 1, 46-56. (Year: 2018).*

Zhang, L., Pereañez, M., Bowles, C, Piechnik, S., Neubauer, S., et al., Missing slice imputation in population CMR imaging via conditional generative adversarial nets, Oct. 2019, Medical Image Computing and Computer Assisted Intervention—MICCAI 2019: 22nd International Conference, pp. 651-659 (Year: 2019).*

Amirrajab, S., Abbasi-Sureshjani, S., Al Khalil, Y., Lorenz, C., et al., XCAT-GAN for synthesizing 3D consistent labeled cardiac MR images on anatomically variable XCAT phantoms, 2020, Medical Image Computing and Computer Assisted Intervention—MICCAI 2020: 23rd International Conference, pp. 128-137 (Year: 2020).*

Nabulsi, Z., Kosaraju, V., & Chakraborty, S., Mrngan: Reconstructing 3D Mri Scans Using A Recurrent Generative Model, 2019, [retrieved on Mar. 12, 2025]. Retrieved from the Internet: <URL: https://vineetkosaraju.com/papers/mrngan.pdf> (Year: 2019).*

Ahmad, B., Jun, S., Palade, V., You, Q., Mao, L., & Zhongjie, M., Improving skin cancer classification using heavy-tailed Student t-distribution in generative adversarial networks (TED-GAN), 2021, Diagnostics, 11(11), 2147 (Year: 2021).*

Asperti, A., & Trentin, M., Balancing reconstruction error and kullback-leibler divergence in variational autoencoders, 2020, Ieee Access, 8, 199440-199448. (Year: 2020).*

Krebs, J., Delingette, H., Ayache, N., & Mansi, T. (2021). Learning a generative motion model from image sequences based on a latent motion matrix. IEEE Transactions on Medical Imaging, 40(5), 1405-1416. (Year: 2021).*

Engel, J., Hoffman, M., & Roberts, A. (2017). Latent constraints: Learning to generate conditionally from unconditional generative models. arXiv preprint arXiv:1711.05772. (Year: 2017).*

Meshry, M., Ren, Y., Davis, L. S., & Shrivastava, A. (2021). Step: Style-based encoder pre-training for multi-modal image synthesis. In Proceedings of the IEEE/CVF conference on computer vision and pattern recognition (pp. 3712-3721). (Year: 2021).*

Shang, W., & Sohn, K. (2019, January). Attentive conditional channel-recurrent autoencoding for attribute-conditioned face synthesis. In 2019 IEEE Winter Conference on Applications of Computer Vision (WACV) (pp. 1533-1542). IEEE. (Year: 2019).*

Amirrajab, S., Lorenz, C., Weese, J., Pluim, J., & Breeuwer, M. (Sep. 2022) Pathology synthesis of 3d consistent cardiac mr images using 2d vaes and gans. In International Workshop on Simulation and Synthesis in Medical Imaging (pp. 34-42). Cham: Springer International Publishing. (Year: 2022).*

Susmith Reddy "The Intuition of Triplet Loss" Published in Analytics Vidhya. Jan. 12, 2019. pp. 1-8.

"Triplet Loss" Deepchecks Glossary. pp. 1-4. Retrieved Oct. 18, 2022. a href="https://deepchecks.com/"target="_blank"https://deepchecks.com//a.

* cited by examiner

SYNTHETIC DATA GENERATION FOR MACHINE LEARNING FOR A CARDIAC MAGNETIC RESONANCE IMAGING TASK

BACKGROUND

The present embodiments relate to generation of synthetic data for machine learning for cardiac magnetic resonance (CMR) imaging tasks. Deep Learning (DL) methods have shown outstanding results in CMR tasks like segmentation, ejection fraction computations, disease classification, plane classification, view classification, or landmark detection. DL methods are data-hungry and require many annotated examples for supervised machine learning. Acquiring many examples may be expensive and time consuming. The many examples should cover a broad range of situations, making acquisition even more difficult. The training data examples may be unbalanced or too small, which in turn can lead to suboptimal DL based prediction performance. Larger datasets may have a bias towards healthy or "normal" patients due to lack of availability of large numbers of examples of some unhealthy patient situations.

Synthetically generated data for DL pipelines may provide missing examples, positively impacting the performance of DL models. One challenge with the current approaches for synthetic data generation, especially in the medical imaging field, is that the user does not have the sufficient control over the resulting images. There are many acquisition parameters not considered by the neural networks used for synthetic data generation, resulting in images that may look realistic but with limited complexity. The synthetic examples may not be sufficient for optimum deep learning of a CMR task.

SUMMARY

Systems, methods, and instructions on computer readable media are provided for generation of synthetic CMR imaging and/or machine learning for a CMR imaging task using synthetic sample generation. A machine-learned model generates synthetic samples. For example, the machine-learned model generates the synthetic samples in response to input of values for two or more parameters from the group of electrocardiogram (ECG), an indication of image style, a number of slices, a pathology, a measure of heart function, sample image, and/or an indication of slice position relative to anatomy. The indication of image style may be in the form of a latent representation, which may be used as the only input or one of multiple inputs. These inputs provide for better control over generation of synthetic samples, providing for greater variance and breadth of samples.

In a first aspect, a method is provided for machine learning for a cardiac magnetic resonance imaging task. A synthetic sample of cardiac magnetic resonance imaging is generated. A machine-learned model outputs the synthetic sample in response to input of a latent representation to the machine-learned model. The latent representation is generated outside of the machine-learned model. A task model for the cardiac magnetic resonance imaging task is machine trained using the synthetic sample as training data. The task model as machine-trained is stored.

In one embodiment, the latent representation is generated by an encoder separately trained from the machine-learned model and the task model. In another embodiment, the latent representation is generated as a representation of style of a cardiac magnetic resonance image. In one embodiment, the latent representation is generated by a machine-learned autoencoder having been trained with a loss based on comparison of an output image with a ground truth image and based on comparison of latent representations.

According to one embodiment, the machine-learned model is a generator that was trained as a generative adversarial network. For example, the generative adversarial network was a recurrent progressive conditional generative adversarial network. In a further example, the machine-learned model is a plurality of up sampling deep neural networks, a plurality of styling deep neural networks, and a plurality of long-short term memories.

As another embodiment, the synthetic sample and additional synthetic samples are generated by variation of the latent representation input to the machine-learned model.

In yet another embodiment, the input to the machine-learned model includes the latent representation and values for one or more parameters. The one or more parameters are a pathology, base and apex indices, an electrocardiogram, an ejection fraction, or a number of slices. In another embodiment, the input is the latent representation, an electrocardiogram, and a cardiac magnetic resonance image.

One or more CMR images are output as the samples for training data. For example, CMR images are output as a plurality of slices at different times.

According to an embodiment, the machine training includes machine training the task model for segmentation, ejection fraction computation, disease classification, plane classification, view classification, or landmark detection. In other embodiments, the task model is machine trained with input of the latent representation and the synthetic sample.

In a second aspect, a method is provided for machine learning for a cardiac magnetic resonance imaging task. Synthetic samples of CMR imaging are generated. A machine-learned model outputs the synthetic samples in response to input to the machine-learned model of different values for two or more from the group of a number of slices, electrocardiogram data, pathology, functional measurement, and slice position relative to anatomy. A task model is machine trained for the cardiac magnetic resonance imaging task using the synthetic samples as training data. The task model as machine-trained is stored.

In an embodiment, the synthetic samples are generated in response to input of the different values for the number of slices, pathology, functional measurement, and slice position relative to anatomy. In another embodiment, the synthetic samples are generating in response to input to the machine-learned model of different values for a latent representation. The latent representation is generated outside of the machine-learned model.

According to an embodiment, the machine-learned model is a generator of a recurrent progressive conditional generative adversarial network.

In a third aspect, a system is provided for generation of synthetic cardiac magnetic resonance imaging. A memory is configured to store different values for each of two or more parameters from the group of an image structure, a number of slices, a slice position relative to anatomy, a functional measurement, and pathology. An image processor is configured to generate sets of synthetic cardiac magnetic resonance images as output by a machine-learned model in response to input to the machine learned model of different values for one or more of the two or more parameters.

In an embodiment, the different values of the image structure are different latent representations generated by a machine-learned encoder, the slice position relative to the anatomy is the slice position relative to an apex and base, the functional measurement is an ejection fraction, and the image processor is configured to generate by the machine-learned model in response to additional input of an electrocardiogram to the machine-learned model.

As another embodiment, the machine-learned model is a generator of a recurrent progressive conditional generative adversarial network.

These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

Comprehensive synthetic data generation enhances the performance of deep learning-based workflows in CMR imaging. Synthetic CINE CMR images are generated. The generation allows for more control over the acquisition characteristics (e.g., number of slices, ejection fraction, base/apex location, consistency over time/space of the style of anatomical structures, etc.). A large number of synthetic patients may be generated that can then be used to improve the overall performance of a large variety of deep learning pipelines, where unbalanced or small datasets represent an issue. Datasets are augmented by synthetically generated "not normal" cases, such as where "not normal" represents cases with low ejection fraction, various disease labels such as myocarditis and HCM, and/or various sizes and appearances of hearts. This augmented dataset is used to train the network for other downstream tasks like segmentation or labelling, adding robustness to the trained network by balancing the input data distribution.

Figure 1:
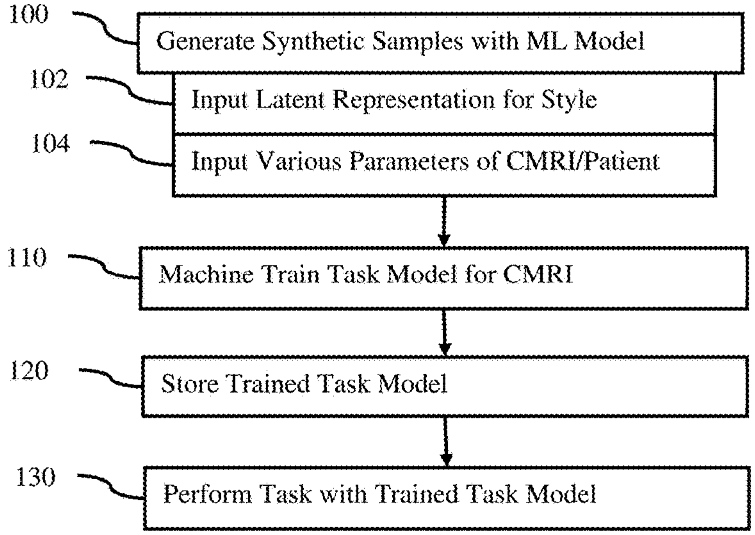
FIG. 1 is a flow chart diagram of one embodiment of a method for machine training for a CRM task using generated synthetic data.

FIG. 1 shows a flow chart of one embodiment of a method for machine learning for a CMR imaging task. To provide more examples and/or more evenly distributed examples, including for rarer not-normal situations (e.g., disease or heart structure), synthetic samples are generated for inclusion in training data. Various inputs for control and a corresponding machine-learned model are used to generate synthetic data, which is then used to machine train for a CMR imaging task.

The method is implemented by a machine (e.g., computer, processor, workstation, or server) using training data (e.g., samples of input and output (ground truth)) in a memory. Additional, different, or fewer acts may be provided. For example, one of acts 102 or 104 is not provided. As another example, act 130 is not performed. In yet another example, an act for gathering training samples from actual patients and/or simulation is included. As another example, an act for controlling the sampling or inputs to generate the synthetic data is performed.

In act 100, an image processor generates a synthetic sample of cardiac magnetic resonance imaging. Many synthetic samples may be generated by varying inputs. Random or systematic variation of the values for one or more inputs creates synthetic samples.

The generated samples are of CMR images, such as a plurality of slices representing the heart at different times. For each time, the same multiple slices representing different parts of the heart are generated. In an embodiment, each sample output by the machine-learned model is a sequence of CMR images, such as CINE MRI SAX frames. Other views, such as LAX or apical four-chamber views, may be generated as the synthetic samples. Multiple different views may be generated for a given sample. The generated sample may be for one time or over a period (e.g., sequence or CINE of MRI SAX frames). Any number of slices may be generated for each time in the sequence. Alternatively, a volume data set is generated for each time in the sequence.

The generated samples are synthetic. The samples are images that do not represent an actual patient. Some aspect of the one or more images is made up or different than real for a given patient. For example, the noise, artifact, anatomical structure (e.g., shape, size, and/or arrangement of parts), pathology, slice position, and/or number of slices is different from an image acquired by scanning a patient. The synthetic data does not represent any actual patient collected for the training data but is instead synthesized.

For machine training in act 110, many samples are acquired. Some or all the samples are synthetic. For actual samples (real or not synthetic), a processor may search patient medical records to locate samples having known results (e.g., ground truth) for actual CMR images are inputs. Past datasets (e.g., from a study) that match the type of input data and output data are found or collected. For example, CMR scans may be available for hundreds or thousands of past patients in a curated collection.

The distribution of samples may not be uniform by pathology or another characteristic. Hence, to be able to train an accurate task model for CMR, data augmentation based on synthetic data may be used to generate a more uniform distribution in the dataset. Overall, the use of synthetic data during the training phase may provide several advantages. A very large number of cases can be automatically generated, leading to an extensive database including rare cases and/or complex configurations in the sampling. For example, samples not frequently in actual patients are created. The augmentation may be done in a way to ensure that a wide range of samples is present in the augmented dataset.

In act 100, the image processor generates training data as synthetic samples. The synthetic samples may be derived from data samples of actual patients and/or simulation, such as using ECG samples, a distribution of values of any input, or images from actual patients to create synthetic images.

Rather than alteration of actual images, the synthetic data is generated based on various input parameters other than an image or in addition to an image. The values of the input parameters may be sampled or controlled to provide the desired distribution of samples for training.

A machine-learned model generates the synthetic samples. The machine-learned model was previously trained to generate output CMR images in response to one or more inputs. This machine-learned model is used to create the synthetic data used as training data to machine train a different task model to perform a CMR imaging task, such as segmentation or disease classification. The machine-learned model for synthetic data generation was previously trained to use one or more parameters to create the synthetic samples.

Various inputs to the machine-learned model may be used. Values for two or more parameters are input. Different values or combinations of values result in different synthetic samples. Acts 102 and 104 provide two examples. In act 102, a latent representation for style is input. In act 104, values for two or more parameters are input. The multiple parameters may or may not include the style. In one embodiment, the inputs include an ECG signal and additional parameters, such as two, three, four, five or more parameters associated with CMR imaging (e.g., CMR scanning parameters, patient parameters, and/or image generation parameters).

In act 102, a parameter representing style is input. In one embodiment, one or the only input is a parameter representing a style (e.g., size, shape, and/or arrangement of anatomy, noise, artifacts, and/or intensity) of the heart. The style may be parameterized in various ways, such as multiple measures. The style is of the CRM imaging. The values (e.g., a patient representation latent vector) encode the "style" of the image. Every patient has its own style (e.g., relative position of organs, symmetry between organs, the shape of the organs, small artifacts, contrast). The style parameter defines a style to be used for the synthetic image.

In one embodiment, the style is parameterized as a latent representation. The latent representation is input to the machine-learned model. The latent representation is generated outside of the machine-learned model. A separate encoder or other machine-learned model generates the latent representation, which is then used as an input to the machine-learned model to generate the synthetic data. The model used to create the latent representation was trained for a different output than the synthetic image. The model to generate the latent representation used a different architecture, input, output, and/or loss function than used by the model to generate the synthetic sample based on input of the latent representation. The model to generate the synthetic sample is more than a further part of a network (e.g., decoder of a encoder-decoder) trained with the part of the network to generate the latent representation (e.g., encoder). The model for synthetic sample generation is not used as part of or for training the model to create the latent representation. The two models are independent of each other. The model for the latent representation is separately trained from the machine-learned model for generating synthetic data and the task model to be trained for a CMR task. For example, the model for latent representation is trained using an image as input to generate an image as output (e.g., generate a segmentation or reproduction). Alternatively, the latent representation is learnt simultaneously while training the machine learned model and task model.

The machine-learned model to generate the synthetic sample generates different samples in response to different latent representations. One or more values in the latent representation being different results in different synthetic samples (e.g., different CMR images).

The latent representation is generated by an encoder or other neural network. In one embodiment, a machine-learned autoencoder generates the latent representation. Other networks or machine learning models may be used.

The model for the latent representation is trained with any input to provide any output. The input and outputs may be related to CMR imaging, patient characteristics, or anatomy. For example, an autoencoder includes an encoder to receive an input CMR image or images and create a latent representation and a decoder to receive the latent representation and create an output image. Actual images may be used.

In one embodiment, the model for the latent representation is a machine-learned autoencoder trained using multiple losses, including one loss based on the latent representation generated in an interior of the autoencoder (e.g., at the bottleneck of an encoder-decoder arrangement). For example, one loss is based on comparison of an output image of the autoencoder with a ground truth image, and another loss is based on comparison of latent representations. The autoencoder generates a latent representation on every individual frame and exports the latent representation from the bottleneck. The loss function of the autoencoder has two terms. The first term is a loss function (e.g., mean square error) that compares the autoencoder reconstructed image with the original input image. The second term uses a triplet loss function to make the latent representations from the same patients be as close as possible between them and as far away as possible from other patients. The Euclidian distance may be used to measure the distance between latent representations in multidimensional space. This triplet loss function minimizes distance between latent vectors of "similar examples" and maximizes distance between latent vectors of dissimilar pairs. The application defines what is similar and dissimilar. For example, similar pairs are frames from the same patient. In one embodiment, the triplet loss is given as: Loss=Triplet Loss(positive pairs, negative pairs) =max (0, D(positive pair)−D(negative pair)+margin), where D is the distance between learned features, such as L2 distance or (1−cosine similarity). Other loss functions for differences between latent representations may be used.

Since there are two loss terms, a weighted combination function may be used. The weights may be adaptive. For example, in the beginning epochs of training, the weight for the reconstructed image loss is higher than the latent representation loss to obtain a good latent representation. Then, the weight for the reconstructed images loss decreases to the detriment of the latent representation loss term.

Figure 2:
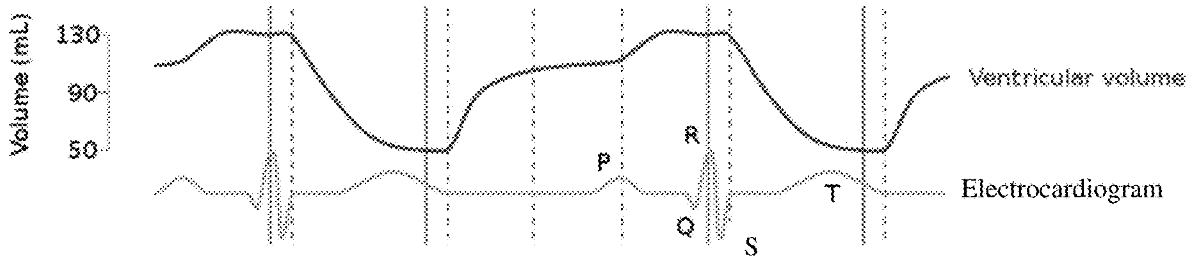
FIG. 2 illustrates example correlation between heart volume and ECG.

In act 104, various parameters instead of or in addition to the latent representation or another parameter for style are input. For example, ECG or data derived from ECG (e.g., PQRST times) are input. For training the task model, every time point or a subset of time points of the Electrocardiogram (ECG) has a corresponding CINE MR imaging frame (e.g., SAX) on each slice. ECG input may be used as there is a strong correlation between the ECG signal and the ventricular volume. FIG. 2 shows this correlation. ECG may be used to establish timepoints for the synthetic CMR images and/or to control the heart volume represented in the synthetic CMR images.

Other input parameters include a pathology, base and apex index, an electrocardiogram, an ejection fraction or other measure of function, and a number of slices. Other input parameters may be clinical characteristics of the patient that could influence the appearance of the images, such as gender, age, smoking history, cholesterol level, and/or body mass index. Other input parameters may be MR scan acquisition settings, such as the sequence (GRE, bSSFP, etc.) or magnet strength (0.5, 1.5, 3T). Any combination of inputs may be provided. Any of the parameters are optional.

Figure 3:
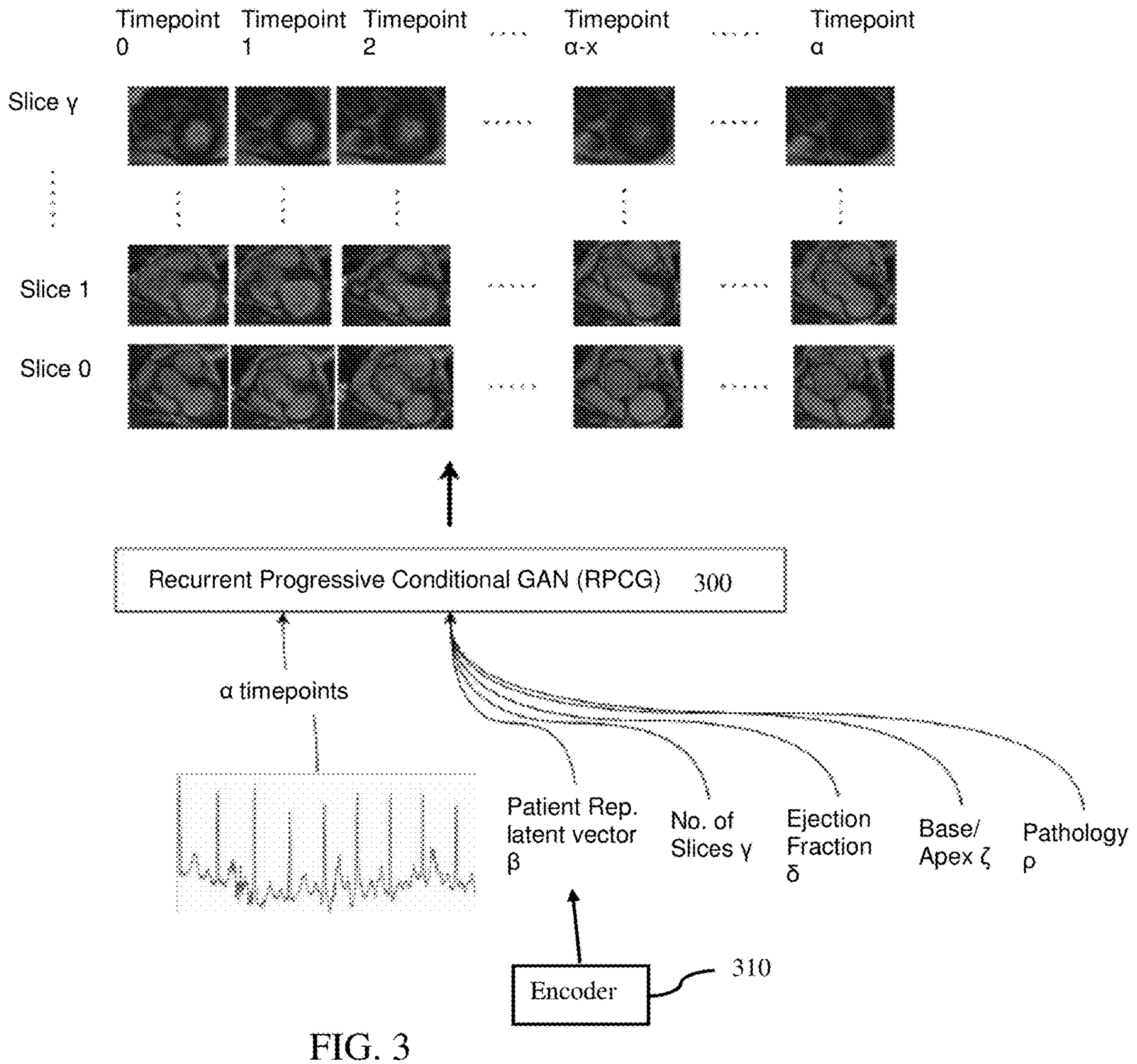
FIG. 3 illustrates inputs and outputs for machine-learned model-based generation of synthetic CMR images.
Figure 4:
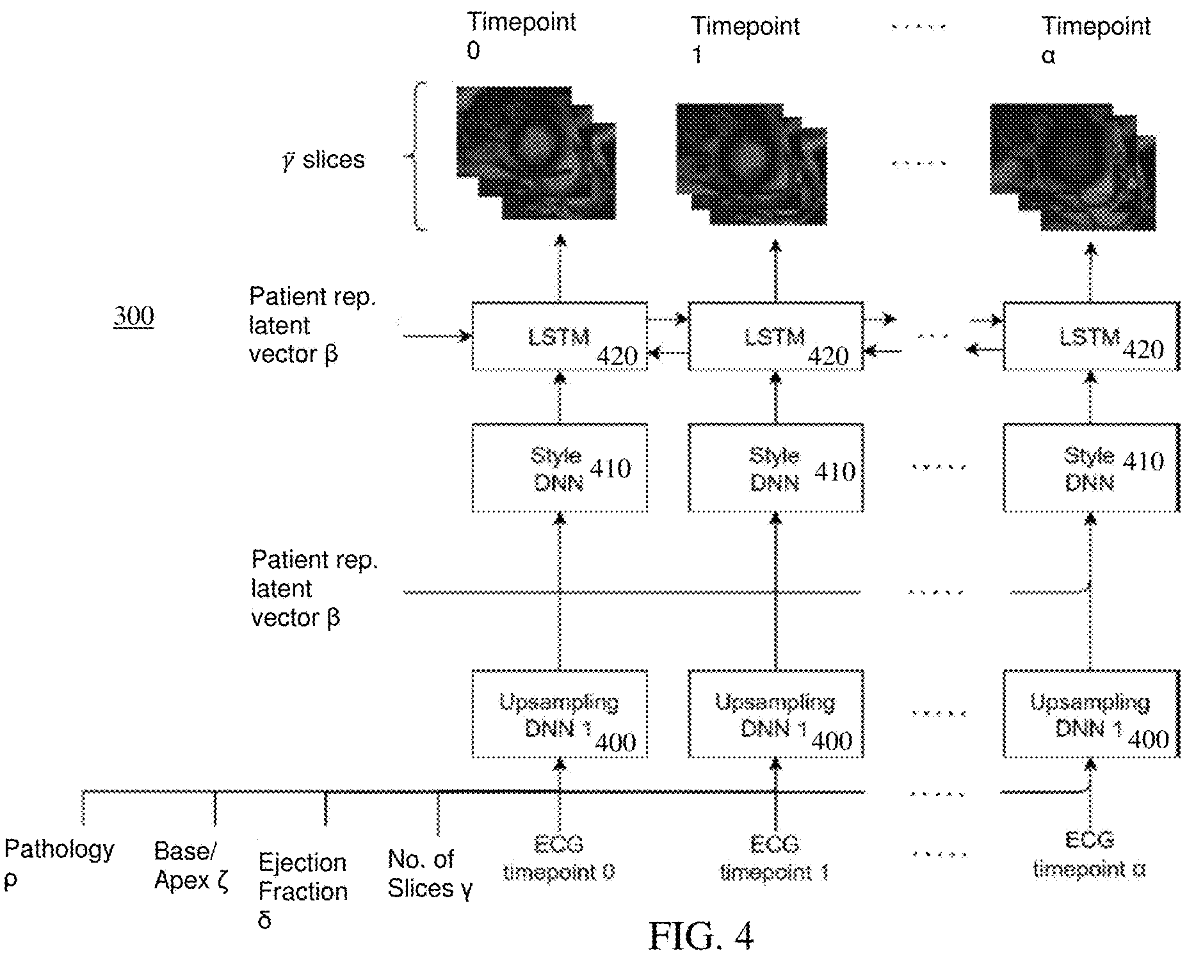
FIG. 4 is a block diagram of one embodiment of a generator neural network for generating synthetic samples.

FIGS. 3 and 4 show examples where the input parameters are the ECG or other timepoints, α, latent vector, β, number of slices, γ, ejection fraction, δ, base/apex index, ζ, and pathology, ρ. Other combinations may be used. Each parameter has a range of values, resulting in different combinations of values being input to the machine-learned model 300. Changing one or more of the values (e.g., number of slices) input to the model 300 results in a change or difference in the output CMR image (e.g., in a difference in one or more slices at one or more time points for CINE CMR SAX example output of FIG. 3). The model 300 generates one or more CMR images in response to input of the values for the ECG, latent representation, number of slices, pathology, functional measurement (e.g., ejection fraction), and slice position relative to anatomy (e.g., Base/Apex). By inputting different values for any, some, or all these inputs, the model 300 generates different output CMR samples.

The number of slices parameter indicates a number of slices, γ, to be output. Any range of values may be used, such as an integer from 1-64. In the example of FIG. 3, the number of slices indicates the desired number of SAX slices for the current acquisition (i.e., the sample to be output).

The ejection fraction is a measure of heart function. Other measures of heart function may be used instead or in addition to the ejection fraction. The ejection fraction indicates how much the left ventricle (LV), right ventricle (RV), and myocardium are changing between end diastole (ED) and end systole (ES) phases of the heart cycle.

The base/apex is an index or indices indicating slice position relative to base and apex anatomy of the heart. Other parameters for indicating slice position in the heart may be used. In one example, the base/apex parameter is a continuous variable from 0-1 defining how far from base to apex the slice lies. For example, 0.5 means the slice is halfway between base and apex.

The pathology parameter describes if the patient has or does not have a given pathology (e.g., fibrosis, thickened arterial walls, blockage, restriction, etc.). A combination of parameters or flags or other coding may be used to indicate combinations of pathology. One value or code may indicate normal or no disease pathology.

An image may be input, such as a sequence of multiple slices of CMR images from a patient, simulation, or synthetically created. In one embodiment, the inputs to the machine-learned model 300 include the latent representation from the encoder 310, an electrocardiogram, and one or more CMR images. The machine-learned model 300 is a multi-domain variational autoencoder (VAE) so may be fed with both ECG and CMR data. The machine-learned model 300 may allow for an efficient encoding and synthesis of both ECG signals and CMR images. Such an approach may be advantageous since a complex dependency exists between the mechanical and the electrophysiological properties of the heart, and, by considering both aspects, potentially more valuable, realistic, and complex synthetic datasets may be obtained.

The machine-learned model 300 was learned from a machine-learning architecture defining relationships between parameters, including learnable parameters. The machine learning learned the values of the learnable parameters of the architecture through optimization using training data.

The architecture may have any number and/or type of layers, nodes, activation functions, learnable parameters, or other structures. In one embodiment, the architecture is a generator of a generative adversarial network (GAN). For example, the generator is a convolutional neural network (CNN) or a fully connected neural network (FCN). For training, a discriminator, such as a CNN or FCN with a softmax, residual blocks, or another layer for classification, is trained in conjunction with the generator, discriminating between real and generated images as output by the generator. The architecture defines the inputs and outputs, including arranging for generation of synthetic realistic CMR images, such as CINE CMR SAX images in a manner controlled by the values of the input parameters. FIG. 3 shows the example where the input parameters for controlling the synthesis of the CINE CMR SAX images as output include the ECG, latent representation, number of slices, ejection fraction, base/apex, and pathology.

The definition of the architecture is by configuration or programming of the learning. The number of layers or units, type of learning, order of layers, connections, and other characteristics of the network are controlled by the programmer or user. In other embodiments, one or more aspects of the architecture (e.g., number of nodes, number of layers or units, or connections) are defined and selected by the machine during the learning.

In one embodiment, the machine-learned model 300 is a recurrent progressive conditional GAN. FIG. 4 shows an example. The machine-learned model 300 includes a plurality of up sampling deep neural networks (DNNs) 400, a plurality of styling DNNs 410, and a plurality of long-short term memories (LSTM) 420. Parallel arrangements of these three layers are created for each timepoint (e.g., sampling of the ECG at different times) to generate a stack of slice CMR images for each time point. The LSTMs 420 communicate over the timepoints for consistency.

Figure 5:
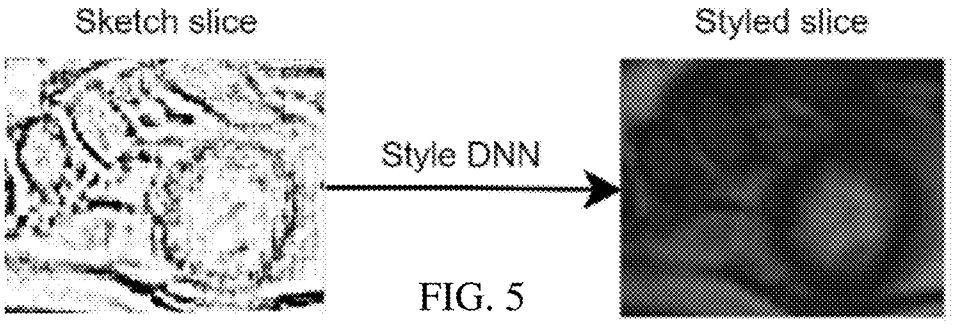
FIG. 5 illustrates an example change for a slice within the network of FIG. 4.

In the first layer, the up sampling DNNs (upsampling DNN 1*s* of FIG. 4) 400 are deep up sampling neural networks (DANNs) employed for converting ECG timepoints into SAX frames. The inputs to each up sampling DNN 400 include the pathology, base/apex, ejection fraction, number of slices, and ECG sample (e.g., ECG magnitude at and/or windowed portion of the ECG centered over a timepoint). The DANNs are configured to output contours (e.g., visible boundaries (sketches)), generating tensors at that timepoint. FIG. 5 shows an example sketch slice for one timepoint. The DANN outputs sketches for the slices at the timepoint. Other DANNs generate other sketches for other timepoints. Each tensor has γ channels, corresponding to respective slices. The output (sketch for the timepoint) of each up sampling DNN 400 passes to the respective style DNN 410. By using the ejection fraction parameter δ, the DANNs adjust the proportions between shapes. The base/apex parameter ζ controls the positions of the base and apex.

In the second layer, the style DNNs 410 are used for styling the images of the timepoints to match a particular patient style. This step may be perceived as filling those shapes with texture and adding small deformations. The latent representation β is input to each of the style DNNs 410 with the sketch slices. The style DNNs 410 output stylized slices as shown in FIG. 5.

In the third layer, a network of LSTMs 420 (LSTM network) correlates the temporal information between tensors that contain spatial information. The latent vector (latent representation β is provided to the initial LSTM 420 (LSTM 420 at timepoint 0) to ensure that frames style is consistent across multiple timepoints. The passing of information over time in the LSTM network propagates the style. Alternatively, the latent representation is provided to each LSTM 420.

In one embodiment, the machine-learned model 300 is a generator from a GAN. The discriminator of the GAN is a classification DNN with residual blocks, but other architectures may be used. The discriminator was trained to classify if the images output by the generator are synthetic or not and/or to classify if the style of a particular synthetically generated patient matches the style of the real patient. The images and/or latent representations generated by input of the images to the autoencoder 310 are compared. The discrimination may be based on other parameters. For example, other neural networks may have been trained to predict ejection fraction and/or base/apex localization. The images are input to these neural networks, and the resulting outputs are compared to ensure that those parameters are matched. Other discriminator-based losses for training the generator (e.g., machine-learned model 300) may have been used.

The defined model 300 (e.g., neural network) is trained to generate outputs. The model 300 is trained by machine learning. Based on the architecture, the model 300 is trained to generate output using the training data to find optimum values for learnable parameters of the model.

The training data includes many samples (e.g., hundreds or thousands) of input data (e.g., real or actual values of the input parameters) and ground truths (e.g., CINE CMR SAX images). The ground truths may be data mined from patient records or obtained from a collection. The network is trained to output based on the assigned ground truths for the input samples.

For training, an optimizer is used, such as Adadelta, SGD, RMSprop, or Adam. The weights of the initial model are randomly initialized, but another initialization may be used. During the optimization, the different distinguishing features are learned. The optimizer minimizes an error or loss, such as the Mean Squared Error (MSE), Huber loss, L1 loss, or L2 loss. The output of the discriminator may have been used as the loss or as an additional loss. The loss may be based on comparison of images (i.e., generator output image and ground truth image) or information derived those images.

Once trained, different combinations of values of the input parameters are input to generate synthetic outputs. A random sampling on a unidimensional distribution is used to choose values for the parameters $\gamma$, $\delta$, $\zeta$ and $\rho$ in the process of generating new patients (synthetic CMR images). The distribution is chosen depending on the nature of the application for which the synthetic data is generated. The latent representation $\beta$ is sampled from a multi-dimensional distribution. The encoder 310 is trained to determine this distribution on the original data (images of the ground truth). Different images may be input to the encoder 310 to sample the style.

Returning to FIG. 1, a processor trains the task model in act 110. The synthetic images are used as training data in the training of the task model. Other training data, such as from actual patients, may also be used. The ground truth for training is automatically generated or curated by experts. Ground truth for the synthetic CMR images is created. The sketch frames may be used to determine the ground truth, such as for segmentation. Machine training using optimization and the training data (samples with ground truth) is performed, such as described above for the machine-learned model 300 or the encoder 310.

The task model is defined to perform a CMR imaging task. For example, the task model is to perform segmentation, ejection fraction computation, disease classification, plane classification, view classification, or landmark detection. Other CMR tasks may be used. The task model is machine trained to perform the task using, at least in part, sample input images generated synthetically in act 100. Other inputs than an image may be included for the task model. In one embodiment, the latent representation used to create the synthetic image sample, or a latent representation created by the encoder 310 for the synthetic image sample is used as an input with the image to the task model. Any of the parameters used to create the synthetic images may also be used as inputs to the task model for learning to perform the given task and for performance of the task once trained.

A large number of synthetic patients can be generated, which can then be used to improve the overall performance of a large variety of deep learning pipelines where unbalanced or small datasets represent an issue. The synthetic examples are combined with the actual patient examples. Using the controls for generating the synthetic examples, a quasi-uniform distribution may be obtained through control of the inputs to the machine-learned model 300. Training datasets are augmented with "not normal" cases generated synthetically, where "not normal" represents cases with low ejection fraction, various disease labels (pathology) such as myocarditis and HCM, sizes and appearances of hearts, etc. This augmented dataset is used to train the task model for other downstream tasks like segmentation and labelling and adds robustness to the task model by balancing the input data distribution.

The task model has any machine-learning network or classifier architecture. For learning features as part of the training (i.e., deep learning), the model is a neural network. Other networks or classifiers may be used, such as a support vector machine or Bayesian classifier. The classifier is a neural network, but other machine training may be used. The defined model (e.g., neural network) is trained to generate an output for one or more tasks. The model is trained by machine learning. Based on the architecture, the model is trained to generate output using the training data to find optimum values for learnable parameters of the model. The optimizer minimizes an error or loss, such as the Mean Squared Error (MSE), Huber loss, L1 loss, or L2 loss between task model output and ground truth.

In act 120, the processor stores the task model as machine-trained in a memory. The architecture, including the model parameters, such as connections, convolution kernels, weights, or other learned values for the network, are stored. The task model is stored in memory to be used for application or testing.

The machine-learned model 300 and/or encoder 310 are used to create synthetic data for training the task model. Since the machine-learned model 300 and/or encoder 310 are not used in application, these models are stored separately. In alternative embodiments, the same memory stores the encoder 310, machine-learned model 300 for generating synthetic samples, and the machine-trained task model, such as the memory used for training the task model. The machine-learned task model may be provided to other memories, such as memories for a server, magnetic resonance imager, computer, or mobile processing device (e.g., tablet). Multiple copies of the task model may be stored at different locations for use to perform the task at those locations.

In act 130, the task model as trained is applied to perform the task. For example, a patient is imaged using CMR. The images are input to the task model, which outputs a segmentation, ejection fraction computation, classification, plane classification, view classification, or landmark detection, or another task output.

The many samples in the training data are used to learn to output given an unseen sample, such as a scan from a patient. The trained task model outputs in response to input of the medical data for a patient. The machine-learned task model may be used to perform the task for any number of patients, such as using the same values of the learned parameters without update for each patient.

The type of training, training data, and architecture of the machine-learned model affect the output classification. Differences in any of these training-related approaches may result in differences in the output for the task. By having performed training in a certain way in the past, the machine-learned model performs differently in application. By including the synthetic samples generated in act 100 in the machine training of act 110, the resulting trained task model operates differently than where the synthetic samples are not included. The synthetic samples provide additional training data, resulting in better model performance. The synthetic samples provide a better distribution of situations or not-normal cases, resulting in better model performance in different situations.

A display displays the output of the task model. This output may be used to assist in diagnosis or prognosis. The display is a visual output. An image processor generates an image. The image may be output to a display, into a patient medical record, and/or to a report.

Figure 6:
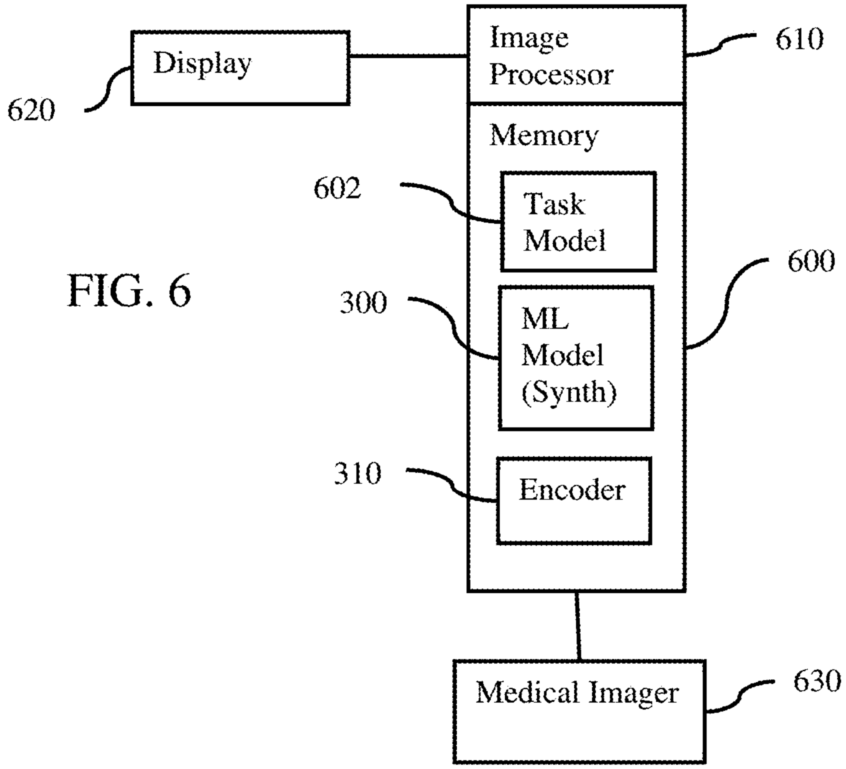
FIG. 6 is a block diagram of one embodiment of a system for generation of synthetic CMR images.

FIG. 6 shows a system for generation of synthetic CMR imaging, training the task model 602 using the synthetic CMR imaging, and/or application using the trained task model 602. The system generates synthetic CMR images in a controlled manner using the machine-learned model 300. Where a latent representation is input, the encoder 310 provides the latent representation to the machine-learned model 300 for generating the synthetic sample used in machine training the task model 602.

The system includes the display 620, memory 600, and image processor 610. The display 620, image processor 610, and memory 600 may be part of the medical imager 630, a computer, server, workstation, or another system for image processing medical images. A workstation or computer without the medical imager 630 and/or display 620 may be used as the system.

Additional, different, or fewer components may be provided. For example, a computer network is included for remote application of the trained task model 602 where the image processor 610 and memory 600 are for training. As another example, a user input device (e.g., keyboard, buttons, sliders, dials, trackball, mouse, or other device) is provided for user interaction with the training and/or synthesis of CMR images.

The medical imager 630 is a magnetic resonance scanner. For example, the medical imager 630 is a MR system having coils or antennas and an electromagnet around a patient bed.

The medical imager 630 is configured by settings to scan a patient. The medical imager 630 is setup to perform a scan for the given clinical problem, such as a cardiac scan. The scan results in scan or image data that may be processed to generate an image of the interior of the patient on the display 620. For example, CINE CMR SAX images are formed for input to the task model 602 as trained.

The image processor 610 is a control processor, general processor, digital signal processor, three-dimensional data processor, graphics processing unit, application specific integrated circuit, field programmable gate array, artificial intelligence processor or accelerator, digital circuit, analog circuit, combinations thereof, or other now known or later developed device for processing medical image data. The image processor 610 is a single device, a plurality of devices, or a network. For more than one device, parallel or sequential division of processing may be used. Different devices making up the image processor 610 may perform different functions. In one embodiment, the image processor 610 is a control processor or other processor of a medical diagnostic imaging system, such as the medical imager 630. In alternative embodiments, the image processor 610 is a processor (e.g., server or computer) for generating synthetic data and/or machine training. The image processor 610 operates pursuant to stored instructions, hardware, and/or firmware to perform various acts described herein.

In one embodiment, the image processor 610 is configured to train one or more machine learning models, such as the task model 602. Based on a user provided or another source of the network architecture and training data, the image processor 610 learns values for learnable parameters of the task model 602.

Alternatively, or additionally, the image processor 610 is configured to apply one or more machine-learned models. For example, the image processor 610 is configured to perform the task using the task model 602 as trained. As another example, the image processor 610 is configured to apply the encoder 310 to generate latent representations and/or to apply the machine-learned model 300 to generate synthetic samples used to train the task model 602.

In one embodiment, the image processor 610 is configured to generate sets of synthetic CMR images as output by the machine-learned model 300 in response to input to the machine-learned model 300 of different values for one or more of multiple parameters. For example, different latent representations from the encoder 310 are input to the machine-learned model 300 to generate different sets of synthetic CMR images (i.e., CMR images with different style or look and feel). In other examples, the slice position relative to the anatomy (e.g., the slice position relative to an apex and base), a pathology, a functional measurement (e.g., an ejection fraction), and/or an ECG are input with or without the latent representation to the machine-learned model 300. The image processor 610 is configured to generate the synthetic CMR images using the machine-learned model 300 in response to the inputs. Other combinations of inputs may be used.

Any sampling of the inputs may be used. Random sampling results in different combinations of input values for synthesis. Systematic sampling, such as guided by CMR images available in a database and/or numbers of samples available for a given situation (e.g., pathology, number of slices, slice position, function (e.g., ejection fraction), and/or style combination), may be used.

The image processor 610 is configured to generate an image. An image showing results of performing the task may be generated. Alternatively, or additionally, the synthetically generated images and/or input values to the machine-learned model may be displayed as an image on the display 620.

The display 620 is a CRT, LCD, projector, plasma, printer, tablet, smart phone or other now known or later developed display device for displaying information, such as images. For example, the display 620 displays CINE CMR images, such as SAX slices over a sequence.

The scan data, training data (e.g., synthetic images or augmented database), values of inputs (e.g., different values for each of two or more parameters from the group of an image structure, a number of slices, a slice position relative to anatomy, a functional measurement, and pathology with or without values for other inputs (e.g., images, ECG, or latent representation)), network definitions, features, machine-learned models (e.g., task model 602, machine-learned model 300, and/or encoder 310), and/or other information are stored in a non-transitory computer readable memory, such as the memory 600. The memory 600 is an external storage device, RAM, ROM, database, and/or a local memory (e.g., solid state drive or hard drive). The same or different non-transitory computer readable media may be used for the instructions and other data. The memory 600 may be implemented using a database management system (DBMS) and residing on a memory, such as a hard disk, RAM, or removable media. Alternatively, the memory 600 is internal to the processor 610 (e.g., cache).

The instructions for implementing the training or application processes, the methods, and/or the techniques discussed herein by the processor 610 are provided on non-transitory computer-readable storage media or memories, such as a cache, buffer, RAM, removable media, hard drive or other computer readable storage media (e.g., the memory 600). Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network. In yet other embodiments, the instructions are stored within a given computer, CPU, GPU or system. Because some of the constituent system components and method steps depicted in the accompanying figures may be implemented in software, the actual connections between the system components (or the process steps) may differ depending upon the manner in which the present embodiments are programmed.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for machine learning for a cardiac magnetic resonance imaging task, the method comprising: generating a synthetic sample of cardiac magnetic resonance imaging, the synthetic sample output by a first machine-learned model in response to input of a latent representation to the first machine-learned model, the latent representation comprising values for a number of slices, pathology, functional measurement, and slice position relative to anatomy, the latent representation generated by a second machine-learned model separate from the first machine-learned model, the second machine-learned model comprising an encoder, wherein the second machine-learned model is trained independently of the first machine-learned model and independently of a task model for the cardiac magnetic resonance imaging task; machine training the task model for the cardiac magnetic resonance imaging task using the synthetic sample as training data; and storing the task model as machine trained.

2. The method of claim 1 wherein generating the synthetic sample comprises generating where the latent representation is generated as a representation of style of a cardiac magnetic resonance image.

3. The method of claim 1 wherein generating the synthetic sample comprises generating by the first machine-learned model comprising a generator having been trained as a generative adversarial network.

4. The method of claim 3 wherein generating the synthetic sample comprises generating where the generative adversarial network was a recurrent progressive conditional generative adversarial network.

5. The method of claim 1 wherein generating the synthetic sample comprises generating by the first machine-learned model comprising a plurality of up sampling deep neural networks, a plurality of styling deep neural networks, and a plurality of long-short term memories.

6. The method of claim 1 wherein generating the synthetic sample comprises generating the synthetic sample and additional synthetic samples by variation of the latent representation input to the first machine-learned model.

7. The method of claim 1 wherein generating the synthetic sample comprises generating with the input to the first machine-learned model of the latent representation and values for one or more parameters, the one or more parameters comprising a pathology, base and apex indices, an electrocardiogram, an ejection fraction, or a number of slices.

8. The method of claim 1 wherein generating the synthetic sample comprises generating cardiac magnetic resonance images as a plurality of slices at different times.

9. The method of claim 1 wherein generating the synthetic sample comprises generating where the latent representation is generated by the second machine-learned model having been trained with a loss based on comparison of an output image with a ground truth image and based on comparison of latent representations of different samples to each other.

10. The method of claim 1 wherein generating the synthetic sample comprises generating with the input comprising the latent representation, an electrocardiogram, and a cardiac magnetic resonance image.

11. The method of claim 1 wherein machine training comprises machine training the task model for segmentation, ejection fraction computation, disease classification, plane classification, view classification, or landmark detection.

12. The method of claim 11 wherein machine training further comprises machine training the task model with input of the latent representation and the synthetic sample.

13. A method for machine learning for a cardiac magnetic resonance imaging task, the method comprising:

generating synthetic samples of cardiac magnetic resonance imaging, the synthetic samples output by a machine-learned model in response to input of a latent representation comprising values for a number of slices, pathology, functional measurement, and slice position relative to anatomy, the latent representation generated by an encoder that is trained independently of the machine-learned model and independently of a task model for the cardiac magnetic resonance imaging task;

machine training the task model for the cardiac magnetic resonance imaging task using the synthetic samples as training data; and storing the task model as machine trained.

14. The method of claim 13 wherein generating the synthetic samples comprises generating by the machine-learned model comprising a generator of a recurrent progressive conditional generative adversarial network.

15. A system for generation of synthetic cardiac magnetic resonance imaging, the system comprising:

a memory configured to store and having stored therein values for each of an image structure, a number of slices, a slice position relative to anatomy, a functional measurement, and a pathology; and an image processor configured to generate sets of synthetic cardiac magnetic resonance images as output by a machine-learned model in response to input to the machine-learned model of different values for the image structure, the number of slices, the slice position relative to anatomy, the functional measurement, and the pathology, wherein the different values of the image structure comprise different latent representations generated by a machine-learned encoder, wherein the different values of the slice position relative to the anatomy comprises the slice position relative to an apex and base, wherein the different values of the functional measurement comprises an ejection fraction, and wherein the image processor is configured to generate by the machine-learned model in response to additional input of an electrocardiogram to the machine-learned model.

16. The system of claim 15 wherein the machine-learned model comprises a generator of a recurrent progressive conditional generative adversarial network.

* * * * *